US011062706B2

(12) United States Patent
Ju et al.

(10) Patent No.: US 11,062,706 B2
(45) Date of Patent: Jul. 13, 2021

(54) SYSTEM AND METHOD FOR SPEAKER ROLE DETERMINATION AND SCRUBBING IDENTIFYING INFORMATION

(71) Applicant: Microsoft Technology Licensing, LLC, Redmond, WA (US)

(72) Inventors: Yun-Cheng Ju, Bellevue, WA (US); Ashwarya Poddar, Seattle, WA (US); Royi Ronen, Tel Aviv (IL); Oron Nir, Hertzeliya (IL); Ami Turgman, Tel Aviv (IL); Andreas Stolcke, Berkeley, CA (US); Edan Hauon, Givatayim (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 10 days.

(21) Appl. No.: 16/397,745

(22) Filed: Apr. 29, 2019

(65) Prior Publication Data
US 2020/0342860 A1 Oct. 29, 2020

(51) Int. Cl.
G10L 15/22 (2006.01)
G10L 15/26 (2006.01)
G10L 21/028 (2013.01)
G10L 17/00 (2013.01)

(52) U.S. Cl.
CPC .............. G10L 15/22 (2013.01); G10L 15/26 (2013.01); G10L 21/028 (2013.01)

(58) Field of Classification Search
CPC ......... G10L 15/22; G10L 15/26; G10L 15/08; G10L 21/028; G10L 17/00; G10L 17/0206; G10L 17/26; H04M 3/53333; H04S 3/004; H04S 7/303; H04S 7/304; H04S 7/305;
(Continued)

(56) References Cited

U.S. PATENT DOCUMENTS 9,484,021 B1* 11/2016 Mairesse ................. G10L 15/02
2014/0142940 A1* 5/2014 Ziv ......................... G10L 17/00
704/235

FOREIGN PATENT DOCUMENTS

WO 2017076211 A1 5/2017

OTHER PUBLICATIONS

"International Search Report and Written Opinion Issued in PCT Application No. PCT/US20/023047", dated Aug. 24, 2020, 15 Pages.

* cited by examiner

Primary Examiner — Leshui Zhang
(74) Attorney, Agent, or Firm — Fiala & Weaver P.L.L.C.

(57) ABSTRACT

Methods for speaker role determination and scrubbing identifying information are performed by systems and devices. In speaker role determination, data from an audio or text file is divided into respective portions related to speaking parties. Characteristics classifying the portions of the data for speaking party roles are identified in the portions to generate data sets from the portions corresponding to the speaking party roles and to assign speaking party roles for the data sets. For scrubbing identifying information in data, audio data for speaking parties is processed using speech recognition to generate a text-based representation. Text associated with identifying information is determined based on a set of key words/phrases, and a portion of the text-based representation that includes a part of the text is identified. A segment of audio data that corresponds to the identified portion is replaced with different audio data, and the portion is replaced with different text.

20 Claims, 6 Drawing Sheets

(58) Field of Classification Search
CPC .. H04S 7/306; H04S 2420/00; H04S 2420/01; G06Q 10/10–1097
USPC ....... 704/239, 240, 238, 243, 244, 255, 266, 704/272, 235
See application file for complete search history.

SYSTEM AND METHOD FOR SPEAKER ROLE DETERMINATION AND SCRUBBING IDENTIFYING INFORMATION

CROSS-REFERENCE TO RELATED APPLICATION(S)

The instant application is related to U.S. patent application Ser. No. 16/397,738 entitled "SYSTEM AND METHOD FOR SPEAKER ROLE DETERMINATION AND SCRUBBING IDENTIFYING INFORMATION," and filed on the same date herewith, the entirety of which is incorporated by reference herein.

BACKGROUND

Customers and other users may interact with support staff for providers of products and services. Interactions between the users and support staff may be performed via voice calls such as by telephone, voice over Internet protocol (VoIP), etc. The providers and/or the support staff may record/save these interactions for user files, and also for determining whether the support staff meets desired metrics and criteria for handling user and customer interactions. Audio data may be separated into segments that correspond to different participants of the interactions through speaker diarization, however the participants' roles in the conversation remain unknown. Additionally, identifying information for users and customers may be provided during interactions. The recording of such identifying information presents risks to privacy and data security.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for speaker role determination and scrubbing identifying information are performed by systems and devices. In one aspect, identification of speaker roles in conversations is performed for audio and/or text data. In speaker role determinations, data from audio files and/or text files is divided into portions related to different speaking parties. In embodiments, characteristics that classify the portions of the data according to speaking party roles are identified in the portions of the data. The portions are aggregated to generate data sets that correspond to each of the speaking party roles. A speaking party role for each of the data sets may be assigned based on the classifying characteristics used to generate the data sets. In another aspect, scrubbing of identifying information for users and customers may also be performed for audio and/or text data. For scrubbing identifying information from data, audio data for speaking parties is processed using automatic speech recognition to generate a text-based representation of the audio data. Text associated with identifying information is determined based on a set of key words, key phrases, and/or patterns. A portion of the text-based representation that includes a part of the text associated with the identifying information is identified for scrubbing. A segment of the audio data that corresponds to the identified portion is replaced with different, replacement audio data, and the portion of the text-based representation that includes the part of the text associated with the identifying information is replaced with different, replacement text.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
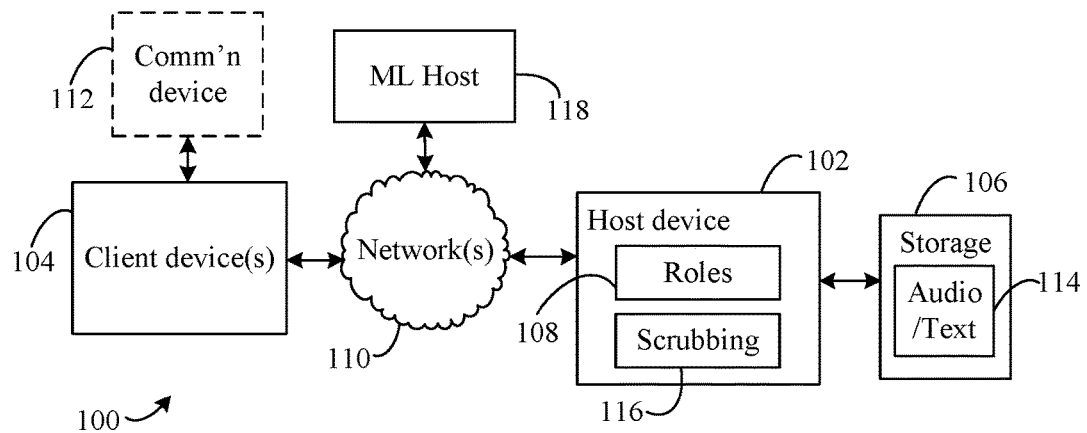
FIG. 1 shows a block diagram of a networked system for determining speaker roles and scrubbing identifying information, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments. Specifically, Section II.A describes embodiments for determining speaking roles, and Section II.B describes embodiments for scrubbing identifying information. Section III below describes example mobile device and computing device embodiments that may be used to implement features of the embodiments described herein. Section IV below describes additional examples and advantages, and Section V provides some concluding remarks.

II. Example Embodiments for Determining Speaking Roles and Scrubbing Identifying Information Methods for speaker role determination and scrubbing identifying information are performed by systems and devices. Identifying speaker roles in conversations may be performed for audio and/or text data. Embodiments herein provide for analyzing telephone calls or recordings thereof, e.g., conducted by call centers and/or produced in other environments, to produce conversation metrics that can be used to evaluate the performance of call participants, such as support staff agents, and/or can be used for other purposes. For example, one metric may indicate whether an agent speaks versus listens more to the customer. However, to properly determine and analyze conversation metrics, the speaking roles of participants for the interaction must be determined, and many current implementations do not utilize separate channels for different speakers in such interactions.

In speaker role determinations according to embodiments, data from audio files and/or text files is divided into portions related to the different speaking parties. A speaker diarization technique or service ("diarization" hereinafter) may be utilized to help segment telephone calls into speaker segments (i.e., which speaker speaks and when), but diarization does not identify speaker roles. Accordingly, there is a need to know which speaker is the agent and which speaker is the customer. According to embodiments herein, characteristics that classify the portions of the data according to speaking party roles are identified in the portions of the data. The data, as noted, may be audio or text data. In embodiments, text data may be classified/identified based on textual patterns, and audio data may be classified/identified based on comparisons of the audio data to known speaker audio samples. In embodiments for textual information utilization in text data, the textual patterns may be based on words, phrases, speech patterns, timing, etc., that are most typically associated with a given speaking party role. For example, a support staff agent may use question words/phrases (e.g., "what," "when," "how," "may I help you," and/or the like), may address the other speaker by name with a title (e.g., "Mrs. Smith," "Mr. Smith," etc.), may refer to the other speaker as "you" instead of "I" and use possessive words such as "your" instead of "mine," may refer to new issue numbers, may be the first speaker in the conversation, and/or the like.

The identified portions are aggregated to generate data sets that correspond to each speaking party role. A speaking party role for each of the data sets may be assigned based on the classifying characteristics used to generate the data sets. In embodiments, the determination of speaking party roles may be made utilizing machine learning (ML) algorithms that may be trained based on stored conversations and editing distances, as described in further detail herein. For instance, a binary classification model may be used for two-speaker conversations to predict whether the first speaker data set/cluster is the agent or not. If the classifier returns a 'false' result, then the first speaker data set/cluster is the customer and the second speaker data set/cluster is the agent; a 'true' result indicates the first speaker data set/cluster is the agent and the second speaker data set/cluster is the customer.

Accordingly, one or both of the following approaches may be used to determine and label speaker roles: (a) a text-based approach to assign speaker role labels by looking at the words in each diarization subset/cluster, or (b) an acoustic based approach for audio data in which agents enroll their voices to build a biometric signature.

Scrubbing identifier information for users and customers may also be performed for audio and/or text data. As noted above, conversation recordings may be used to determine conversation metrics (e.g., for support staff agent performance) and/or for developing models via ML to determine speaking roles in conversations. Transcripts, audio recordings, and/or phone calls may be stored, indexed, and processed for call centers, VoIP conversations, other types of transcripts, etc. The removal of end user identifying information (EUII), or "identifying information" hereinafter, such as email addresses, phone numbers, credit card numbers, social security numbers, account numbers, etc., from audio recordings and transcriptions is important to maintain user privacy and data security. However, these kinds of identifying information are difficult to correctly identify themselves in audio recordings. For example, it may take multiple turns between speakers to communicate and confirm identifying information in conversations, and speech recognizers make many mistakes in their determinations for such conversations.

For instance, in a scenario in which a speaker tells her password, e.g., "Pi10t" which includes alphanumeric characters and specific punctuation that need to be pronounced and specified individually, to her spouse or a support staff agent over a voice call, it may take more than one, perhaps several, rounds of the conversation with speech from each party, including confirmation, to successfully deliver the information. In this scenario, the speaker may say the password which, after transcribing, may result in: "pilot capital 'p' eye one zero tee." It is also possible that the ASR (automatic speech recognition) may transcribe '1' as "won" instead of "one," or that T may be transcribed as "tea," or that "capital 'p'" may be transcribed incorrectly, and such mistakes can lead to misidentification of the password. Moreover, if the speaker must repeat some or all of the password to ensure that the listening party has the password correct, the password will exist is in whole or in part at several locations in the text. With only ASR transcriptions and/or diarization, the identifying information is very difficult to correctly identify from audio recordings.

Additionally, the removal of too much data from a conversation in order to be sure the identifying information is caught risks the removal of valuable data and context used for metrics, as noted above. That is, preserving as much of the conversation and its context, i.e., what is going on in the conversation, while scrubbing off personal data so that a customer cannot be identified through the conversation data, provides for useful leftover data that remains valuable for generating insights. Embodiments herein provide for contextual algorithms based on an understanding of ASR limitations to remove requisite portions of identifying information based on the surrounding context to ensure privacy/data security while not removing contextually useful portions of the conversation.

In embodiments, for scrubbing identifier information from data, audio data for speaking parties may be processed using automatic speech recognition to generate a text-based representation of the audio data. Text associated with identifying information may be determined based on a set of key words and/or key phrases that are predefined or predetermined and stored. In this description, the term key phrases may also encompass a key word or key words. A portion of the text-based representation that includes a part of the text associated that is with the identifying information is identified for scrubbing. In embodiments, this portion may be larger than just the identifying information, and may include additional context information, e.g., the word "email," the phrase "dot com," a length of numbers/alphanumeric character such as a 16-digit number for a credit card, a 7- or 10-digit telephone number, etc., while other words that may be misconstrued or confused by ASR, e.g., "at" may or may not represent '@', may be ignored as contextual key phrases but may be used as context when combined with "email" and/or "dot com." A segment of the audio data that corresponds to the identified portion may be replaced with different audio data, such as but not limited to, silence, a constant tone, etc., and the portion of the text-based representation that includes the part of the text associated with the identifying information is replaced with different text, including but without limitation, blank characters, asterisks ('*'), hyphens ('-'), descriptors, and/or the like.

In embodiments, a length (e.g., a number of characters) and/or a contextual boundary may be used to limit scrubbing. When a length or number of characters is used to scrub identifying information, an upper limit may be placed on the length/number of characters, which may be based on the type of identifying information and/or the context, e.g., few email addresses contain 40 characters or more, etc. For a boundary-limited scrubbing, the context of the text may be utilized to determine how much of the content is to be scrubbed, e.g., if an email address is identified, "dot com" may be scrubbed along with preceding characters back to a phrase such as "my email is," "email," and/or the like. In embodiments, a meta-description of the scrubbed material may be used as a replacement for scrubbed text, e.g., "EMAIL-ADDRESS," "CREDIT-CARD-NUMBER," other descriptors, etc., for the benefit of later review and/or analytical algorithms.

Accordingly, instances of identifying information may be removed from one or more of a text representation of audio data for a conversation and/or the audio data itself while maintaining the maximum amount of data and context for the conversation.

These and further embodiments will be described in further detail below, and in the Sections and Subsections that follow.

Systems, devices, and apparatuses may be configured in various ways to perform their functions for determining speaker roles in conversations and/or for scrubbing identifying information from audio/text files for conversations. For instance, FIG. 1 is a block diagram of a networked system 100, according to embodiments. System 100 is configured to enable determinations of speaking roles in text/audio conversations, and to scrub identifying information from text/audio conversations, according to embodiments. As shown in FIG. 1, system 100 includes a host device 102, a client device(s) 104, and a machine learning (ML) host 118. In embodiments, host device 102, ML host 118, and client device(s) 104 may communicate with each other over a network 110. It should be noted that various numbers of host devices, client devices, and/or ML hosts may be present in various embodiments. Additionally, any combination of the components illustrated in FIG. 1 may be present in system 100, according to embodiments.

As noted above, host device 102, client device(s) 104, and ML host 118 are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like. In some embodiments, e.g., for legacy recordings, data may also be transferred, in addition to or in lieu of, using a network, on physical storage media, between client device(s) 104, ML host 118, and/or host device 102.

ML host 118 may comprise one or more server computers or computing devices, which may include one or more distributed or "cloud-based" servers. In embodiments, ML host 118 may be associated with, or may be a part of, a cloud-based service platform such as Microsoft® Azure® from Microsoft Corporation of Redmond, Wash. Host devices such as host device 102 and/or client devices such as client device(s) 104 may be configured to provide data files, including audio and text files, associated with conversations or speech to ML host 118 via network 110. ML host 118 may be configured to train/re-train/generate models, algorithms, etc., for determining speaker roles in conversations and/or for scrubbing identifying information from audio/text files for conversations. In embodiments, neural networks may be implemented by ML host 118.

It should be noted that as described herein, embodiments of ML host 118 are applicable to any type of system where a system for machine learning communicates with client devices over a network. One example noted above is where ML host 118 is a "cloud" implementation, application, or service in a network architecture/platform. A cloud platform may include a networked set of computing resources, including servers, routers, etc., that are configurable, shareable, provide data security, and are accessible over a network such as the Internet. Cloud applications/services such as for machine learning may run on these computing resources, often atop operating systems that run on the resources, for entities that access the applications/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

Client device 104 may be any type or combination of computing device or computing system, including a terminal, a personal computer, a laptop computer, a tablet device, a smart phone, a personal digital assistant, a telephone, and/or the like, including internal/external storage devices, that may be utilized to record conversations, e.g., conversations between speaking parties. Conversations may take place via a telephone component of client device 104, though VoIP, etc., and may be stored/recorded as audio files and/or text files. In embodiments, client device 104 may be used by various types of users, such as an administrator, support staff agents, customers, clients, and/or the like that participate in interactions with audio and/or text.

System 100 may additionally include a communication device 112 communicatively coupled to client device 104. For instance, in embodiments for which client device 104 does not specifically include hardware/software to interact in a conversation with a remote entity, e.g., a technical support call from a client to a support staff agent, communication device 112 enables such conversations. Accordingly, communication device 112 may be any type of telephone, smart phone, etc. In some embodiments, client device(s) 104 may comprise a server or storage device, e.g., as noted below for system 100, by which conversations are recorded, transcribed, and/or stored.

Host device 102 may comprise one or more server computers or computing devices, which may include one or more distributed or "cloud-based" servers, as described above. Host device 102 may include a roles manager 108 that is configured to determine speaking roles for conversations, as described herein, and may include a scrubbing manager 116 that is configured to scrub identifying information from conversations, as described herein. While not shown for brevity and illustrative clarity, either or both of roles manager 108 and scrubbing manager 116 may be included in client device(s) 104.

System 100 may include a storage 106, that may be a stand-alone storage system (as shown), and/or may be internally or externally associated with host device 102. In embodiments, storage 106 may be communicatively coupled to network 110. That is, storage 106 may be any type of storage device or array of devices, and while shown as being communicatively coupled to host device 102, may be networked storage that is accessible via network 110. Additional instances of storage 106 may be included in addition to, or in lieu of, the embodiment shown. Storage 106 is configured to store different types of data, including but not limited to, audio data files for conversations, transcriptions or text files of such audio data files or of other conversations, any types of documents, media/multi-media files, ML models, and/or the like.

A host device such as host device 102 (or a client device such as client device(s) 104) may be configured in various ways for determining speaker roles and/or for scrubbing identifying information. For instance, referring now to FIG. 2, a block diagram of a system 200 is shown for determining speaker roles in conversations and/or for scrubbing identifying information from audio/text files for conversations, according to an example embodiment. System 200 may be an embodiment of system 100 of FIG. 1. System 200 is described as follows.

Figure 2:
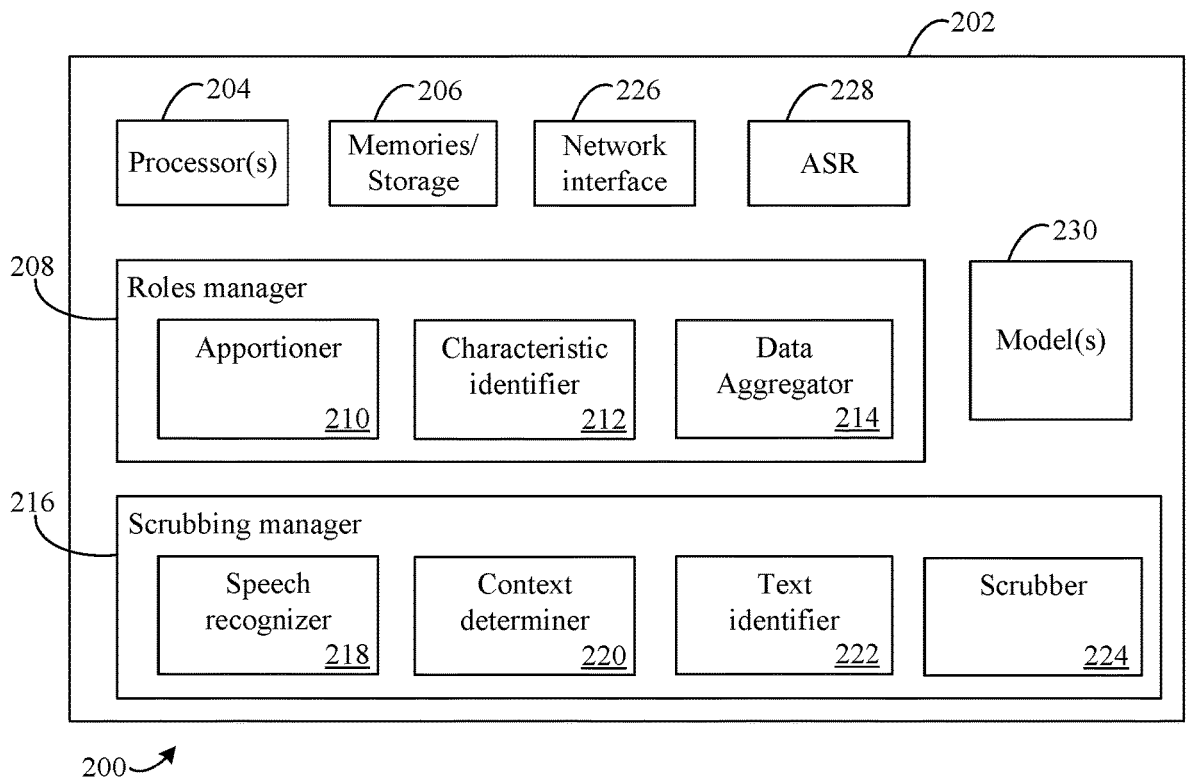
FIG. 2 shows a block diagram of a computing system configured for determining speaker roles and scrubbing identifying information, according to an example embodiment.

System 200 includes a computing device 202, which may be an embodiment of host device 102 of FIG. 1 (or client device(s) 104), and may be any type of server or computing device, as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 226, a roles manager 208 that may be an embodiment of roles manager 108 of FIG. 1, and a scrubbing manager 216 that may be an embodiment of scrubbing manager 116 of FIG. 1. System 200 may also include additional components (not shown for brevity and illustrative clarity) including, but not limited to, components and subcomponents of other devices and/or systems herein, as well as those described below with respect to FIGS. 10 and 11, such as an operating system, etc.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories (e.g., a cache for query processing), remote processors or memories, and/or distributed processors or memories. Processor 204 may be a multi-core processor configured to execute more than one processing thread concurrently. Processor 204 comprises circuitry that is configured to execute computer program instructions such as, but not limited to, embodiments of roles manager 208 and/or scrubbing manager 216, which may be implemented as computer program instructions for determining speaker roles and/or for scrubbing identifying information, etc., as described herein. Memory 206 may include storage 114 of FIG. 1 in embodiments, and may be configured to store such computer program instructions/code, as well as to store other information and data described in this disclosure including, without limitation, one or more public/private key pairs shown as key(s) 222, etc.

Network interface 226 may be any type or number of wired and/or wireless network adapter, modem, etc., configured to enable system 200 to communicate with other devices over a network, such as communications between system 200 and other devices utilized in a network as described herein (e.g., client device 104, host device 102, ML host 118, and/or storage 106) over a network such as network 110 as described above with respect to FIG. 1.

System 200 may also include an automatic speech recognition (ASR) engine 228 and one or more ML models as model(s) 230. ASR engine 228 is configured to convert speech data from an audio file into a text representation thereof. Model(s) 230 may represent ML models generated by ML host 118 of FIG. 1.

Roles manager 208 includes a plurality of components for performing the functions and operations described herein for determining speaker roles. For instance, roles manager 208 is configured to assign speaking party roles for one or more speaking parties in a conversation. As noted above, a conversation may comprise recorded audio data in a first file and/or may comprise transcribed text data from audio data in a text file. In embodiments, as shown in FIG. 2, system 200 may include ASR engine 228 which may be configured to generate such transcribed text data.

As shown, roles manager 208 includes an apportioner 210, a characteristic identifier 212, and a data aggregator 214. While shown separately for illustrative clarity, in embodiments, one or more of apportioner 210, characteristic identifier 212, and/or data aggregator 214, may be combined together and/or as a part of other components of system 200. In some embodiments, less than all of the components of roles manager 208 illustrated in FIG. 2 may be included. In software implementations, one or more components of roles manager 208 may be stored in memory 206 and are executed by processor 204.

Apportioner 210 may be configured to divide data from audio and/or text files into portions. Apportioner 210 may perform this division via diarization. A diarization service (not shown) itself may only separate an entire conversation for two speaking parties, e.g., from a telephone call or transcription/ASR text, into two speaker clusters comprised of the respective portions. However, without the ability to identify which group of portions (i.e., which cluster) is specifically associated with each speaking party, the diarization alone is not sufficient. Accordingly, a "speaker role" label is needed for each cluster to identify the agent. In other words, in order to properly generate metrics and applications, such as application programming interfaces (APIs), two labeled clusters (e.g., agent vs. customer) are required. It should also be noted that with two speaking parties, identifying and labeling one speaking party implicitly identifies and labels the other speaking party. In embodiments, characteristic identifier 212 and data aggregator 214 are configured to perform the remaining operations for identifying and labeling speaking parties.

Characteristic identifier 212 may be configured to find speaking party role characteristics in each portion generated by apportioner 210 (e.g., based on stored agent voice samples for audio, and/or based on textual patterns for text), and to assign speaking party roles to data sets comprised of the portions. Data aggregator 214 may be configured to generate the data sets. In embodiments, the data sets correspond to different speaking parties present in the data.

Accordingly, one or more of a text-based approach to assign speaker role labels by looking at the words in each diarization subset or an acoustic based approach for audio data in which agents enroll their voices to build a biometric signature may be used to determine and label speaker roles utilizing roles manager 208.

Roles manager 208, apportioner 210, characteristic identifier 212, and data aggregator 214 are described in further detail below in Section II.A.

Scrubbing manager 216 includes a plurality of components for performing the functions and operations described herein for scrubbing identifying information. For instance, scrubbing manager 216 is configured to scrub identifying information for one or more speaking parties in a conversation. As shown, scrubbing manager 216 includes a speech recognizer 218, a context determiner 220, a text identifier 222, and a scrubber 224. While shown separately for illustrative clarity, in embodiments, one or more of speech recognizer 218, context determiner 220, text identifier 222, and/or scrubber 224, may be combined together and/or as a part of other components of system 200. In some embodiments, less than all of the components of scrubbing manager 216 illustrated in FIG. 2 may be included. In software implementations, one or more components of scrubbing manager 216 may be stored in memory 206 and are executed by processor 204.

Speech recognizer 218 may be configured to receive audio data files associated with a speaking party(ies) and generate text-based representations of the audio data. In embodiments, as shown in FIG. 2, system 200 may include ASR engine 228 which may be configured to generate such text-based representations of the audio data. ASR engine 228 may comprise a portion of speech recognizer 218, or may be a separate component that is accessed by speech recognizer 218. In some embodiments, a text file with text data may be received instead of an audio data file.

Context determiner 220 may be configured to determine the context associated with portions of the text-based representation based on key word/key phrase comparisons. For example, key phrases that indicate a context associated with identifying information may be determined by context determiner 220. Text identifier 222 may be configured to identify parts of the text, based on the context, that include identifying information of a customer or user. That is, within the portions of text that have a context indicative of identifying information, only a specific part of those portions may be identified for scrubbing in order to leave as much of the original text (that is not identifying information) not scrubbed. Scrubber 224 may be configured to scrub data that relates to identifying information in audio and/or text files.

Accordingly, instances of identifying information may be removed from one or more of a text representation of audio data for a conversation and/or the audio data itself, while maintaining the maximum amount of data and context for the conversation, utilizing scrubbing manager 216.

Scrubbing manager 216, speech recognizer 218, context determiner 220, text identifier 222, and/or scrubber 224 are described in further detail below in Section II.B.

A. Additional Embodiments for Determining Speaking Roles

Figure 3:
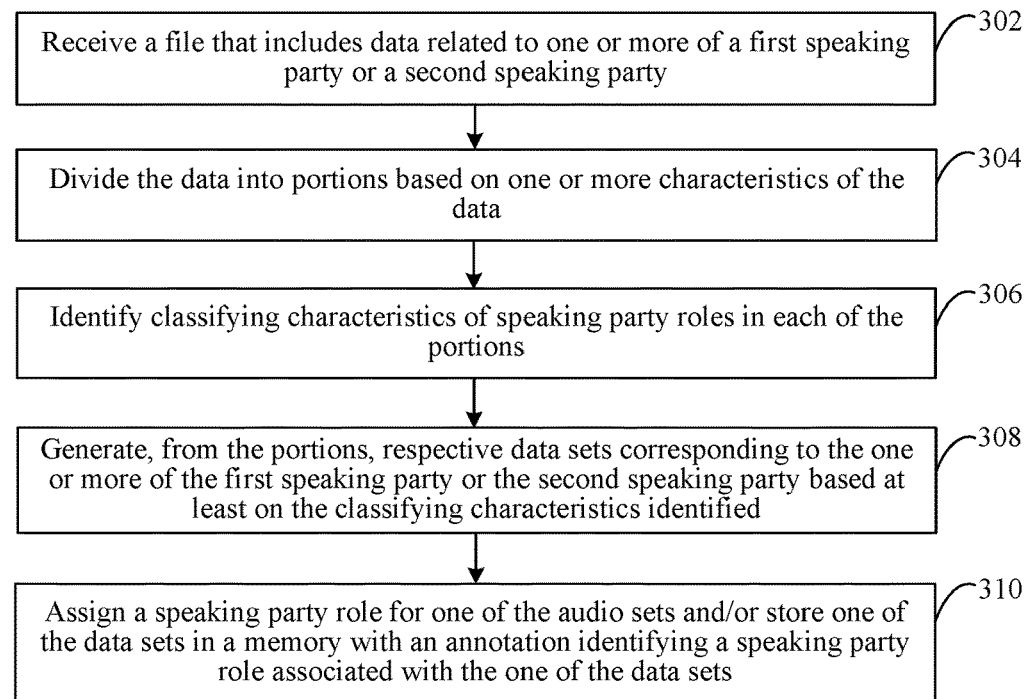
FIG. 3 shows a flowchart for determining speaker roles, in accordance with an example embodiment.
Figure 4:
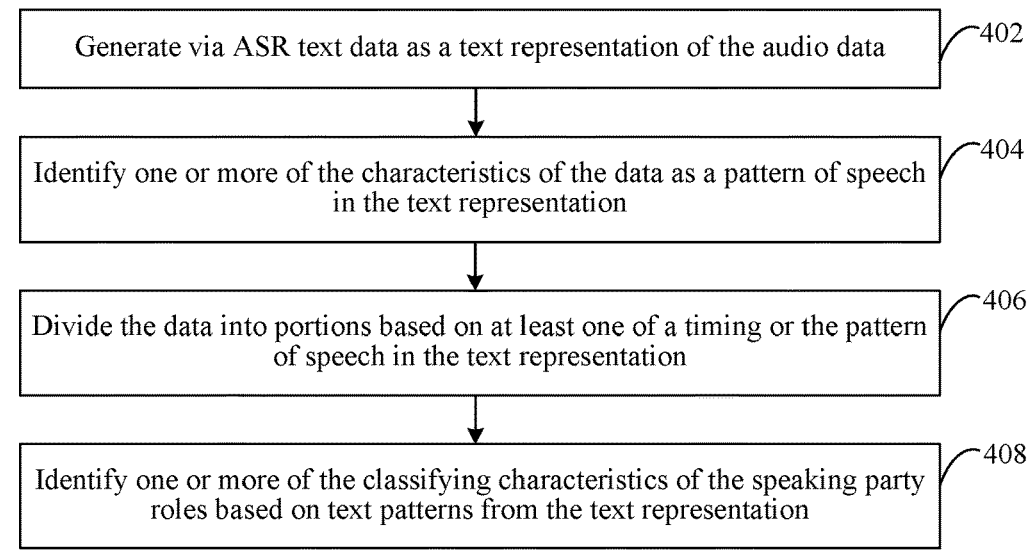
FIG. 4 shows a flowchart for determining speaker roles, in accordance with an example embodiment.
Figure 5:
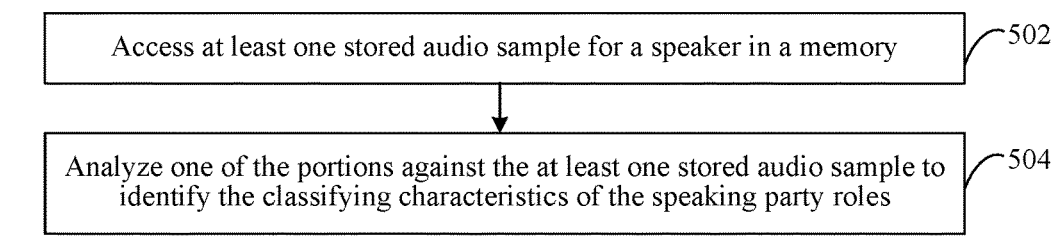
FIG. 5 shows a flowchart for determining speaker roles, in accordance with an example embodiment.

As noted above for FIGS. 1 and 2, embodiments herein provide for determinations of speaker roles in conversations. System 100 of FIG. 1 and system 200 of FIG. 2 may each be configured to perform such determinations. For instance, FIGS. 3, 4, and 5 will now be described. FIG. 3 shows a flowchart 300, FIG. 4 shows a flowchart 400, and FIG. 5 shows a flowchart 500, each being for determinations of speaker roles in conversations, according to example embodiments. Role manager 208 may operate according to flowchart 300, flowchart 400, and/or flowchart 500 in embodiments. Further structural and operational examples will be apparent to persons skilled in the relevant art(s) based on the following descriptions. Flowchart 300, flowchart 400, and/or flowchart 500 are described as follows with respect to system 100 of FIG. 1 and system 200 of FIG. 2.

Flowchart 300 begins at step 302. In step 302, a file that includes data related to one or more of a first speaking party or a second speaking party is received. For example, apportioner 210 of FIG. 2 may be configured to receive the file. The file may include text- or audio-based data of a conversation, e.g., a telephone call between a customer and a support staff agent although embodiments herein are not so limited. The file may be received via network 110 from client device(s) 104 as in FIG. 1, from storage 106 as in FIG. 1, or from memory 206 shown in FIG. 2. In embodiments, apportioner 210 may receive a text-based file from a storage device subsequent to transcription therefor by ASR engine 228, or the like.

In step 304, the data is divided into portions based on one or more characteristics of the data. For example, apportioner 210 may be configured to divide the data into portions. As noted above, such a division may be performed by diarization techniques, and may be based at least on characteristics of the data. In embodiments, the data characteristics utilized in step 304 may be specific to text- or audio-based data, as described in further detail below. In one example, audio data may be analyzed to determine breaks or pauses in speech comprising the audio data that are within a specified threshold value, phrases recognized as questions or other types of phrases, a break or pause in speech that exceeds the specified threshold, different voices speaking, and/or the like.

In step 306, classifying characteristics of speaking party roles in each of the portions are identified. For instance, characteristic identifier 212 may be configured to identify classifying characteristics of speaking party roles in each of the portions. Classifying characteristics may include, but are not limited to, textual patterns for text representations of audio data, audio samples for known speakers, etc.

Referring also now to FIG. 4, flowchart 400 may be performed for embodiments in which the data from the file of flowchart 300 is text data. Flowchart 400 is described in view of step 304 and step 306 of flowchart 300. Flowchart 400 begins at step 402.

In step 402, text data is generated, via ASR, as a text representation of the audio data. For example, speech recognizer 218 and/or ASR engine 228 of FIG. 2 may be configured to generate text representations of audio data for conversations between speaking parties. Audio files may be stored in a non-volatile memory, e.g., memory 206 of FIG. 2, storage 106 of FIG. 1, etc., upon receipt from client device(s) 104 and retrieved for performance of step 402, or may be temporarily stored in volatile memory such as a RAM of memory 206 for real-time, or near real-time, transcription. In embodiments, step 402 may be performed at any time prior to step 304 of flowchart 300.

In step 404, one or more of the characteristics of the data is identified as a pattern of speech in the text representation. For example, apportioner 210, or another component of system 200, may be configured to identify characteristics of the text representation that include one or more patterns of speech. In an embodiment, a pattern of speech may include blocks of contiguous speech having breaks or pauses within a specified threshold value, phrases recognized as questions or other types of phrases, a break or pause in speech that exceeds the specified threshold, and/or the like. In embodiments, step 404 may be performed at any time prior to step 304 of flowchart 300.

In step 406, the data is divided into portions based on at least one of a timing or the pattern of speech in the text representation. For example, as noted above apportioner 210 may be configured to divide the data into portions based on one more patterns of speech. That is, speech in the text representations may be divided into portions according to blocks of contiguous speech, types of phrases, breaks or pauses in speech, etc., where each determined pattern indicator may designate a division. Step 406 may be an embodiment of step 304.

In step 408, one or more of the classifying characteristics of the speaking party roles is identified based on textual patterns from the text representation. For instance, characteristic identifier 212 may be configured to identify classifying characteristics of speaker roles in text based on textual patterns within the text or portions thereof. In embodiments, textual patterns for text data may be based on words, phrases, speech patterns, timing, etc., that are most typically associated with a given speaking party role, including but without limitation, question words/phrases, addresses to the other speaker by name with a title, references to the other speaker as "you" instead of "I" and the use of possessive words such as "your" instead of "mine," references to new issue numbers, a greeting as the first speaker in the conversation, and/or the like. Textual patterns may be stored in a memory, e.g., memory 206 of FIG. 2, storage 106 of FIG. 1, etc., and compared against the text data for identifications/classifications. Step 408 may be an embodiment of step 306 of flowchart 300.

Based on the results of flowchart 400, flowchart 300 may resume at step 308.

Referring now to FIG. 5, flowchart 500 may be performed for embodiments in which the data from the file of flowchart 300 is audio data. Flowchart 500 is described in view of steps 304 and 306 of flowchart 300. Flowchart 500 begins at step 502.

In step 502, at least one stored audio sample for a speaker is accessed in a memory. For example, apportioner 210, or another component of system 200, may be configured to access and/or retrieve (as part of the access) stored audio samples from a storage, such as a memory (e.g., memory 206) or other storage device (e.g., storage 106) described herein and provide the audio sample(s) to apportioner 210, or another component of system 200, for performance of step 504 described below. In other embodiments, the audio sample(s) may be accessed by processor 204 for performance of step 504. In one example, a speaking party, e.g., a support staff agent, may pre-enroll with his/her voice to create a 'voice font' that is acoustically based. This voice font may be stored and indexed according to the name of the speaking party. Enrollment may include recording the voice of the speaking party for a given period of time, e.g., one minute. In other embodiments, an agent may adopt or be otherwise assigned to, or identified with, sample audio speaker clusters in the system. In embodiments, step 502 may be performed at any time prior to step 304 of flowchart 300.

In step 504, one of the portions is analyzed against at least one stored audio sample to identify the classifying characteristics of the speaking party roles. For instance, characteristic identifier 212 may be configured to identify the classifying characteristics in step 504 based on an analysis of a portion (e.g., via division in step 304) against the audio sample(s) retrieved/accessed in step 502. Accordingly, for speaker role identification in audio data, portions may be determined as having a higher speaker identification score with respect to a 'voice font', if the agent name is known, or may be compared against all different audio samples of agents enrolled if the agent name is unavailable. Step 506 may be an embodiment of step 306.

It should be noted that the described embodiments include the concurrent, partially concurrent, and/or serial performance of one or more steps of flowchart 400 and flowchart 500. In such embodiments, a result from either, or both, of flowchart 400 and flowchart 500 may be used in furtherance of flowchart 300 for determinations of speaker roles in conversations.

Flowchart 300 continues with step 308. In step 308, respective data sets corresponding to the one or more of the first speaking party and/or the second speaking party are generated, from the portions, based at least on the classifying characteristics identified. For example, data aggregator 214 may be configured to generate data sets for speaking parties from the portions. That is, the classifying characteristics identified in step 306 (and/or in flowchart 400 and/or flowchart 500) may be utilized by aggregator 214 to generate data sets comprising portions with similar classifying characteristics.

In step 310, a speaking party role is assigned for one of the data sets, and/or one of the data sets is stored in a memory with an annotation identifying the speaking party role associated with the one of the data sets. For instance, characteristic identifier 212 may be configured to assign a speaking party role for one of the data sets generated by aggregator 214 in step 308 above. In one example, a data set of audio data portions determined to be associated with a specific agent may be assigned an "agent" role while another data set for the same conversation may be assigned a "customer" or "user" role. Likewise, a data set of text data determined to be associated with a textual patterns of speech used by an agent may be assigned an "agent" role while another data set for the same conversation may be assigned a "customer" or "user" role. A data set may be stored in a storage, such as but without limitation, memory 206 and/or storage 106 by roles manager 208 or a component thereof, in embodiments. Such stored data sets may be stored with annotations that identify the speaking party role associated with the data set. For instance, a data set generated based on classifying characteristics of an "agent" may be stored with an associated annotation for later use according to the embodiments herein.

Embodiments herein also provide for maintaining and/or processing ML (machine learning) model training data for models which may be used to perform determinations of speaker roles in conversations and/or scrubbing of identifying information. For example, referring again to system 100 of FIG. 1 and system 200 of FIG. 2, computing device 202 in system 200 may include one or more model(s) 230 that are trained, generated, and/or updated by ML host 118 of system 100. In such embodiments, training data for ML models may be maintained and/or processed to identify, per speaking party, portions of a conversation based on editing distances, as described in further detail below.

Figure 6:
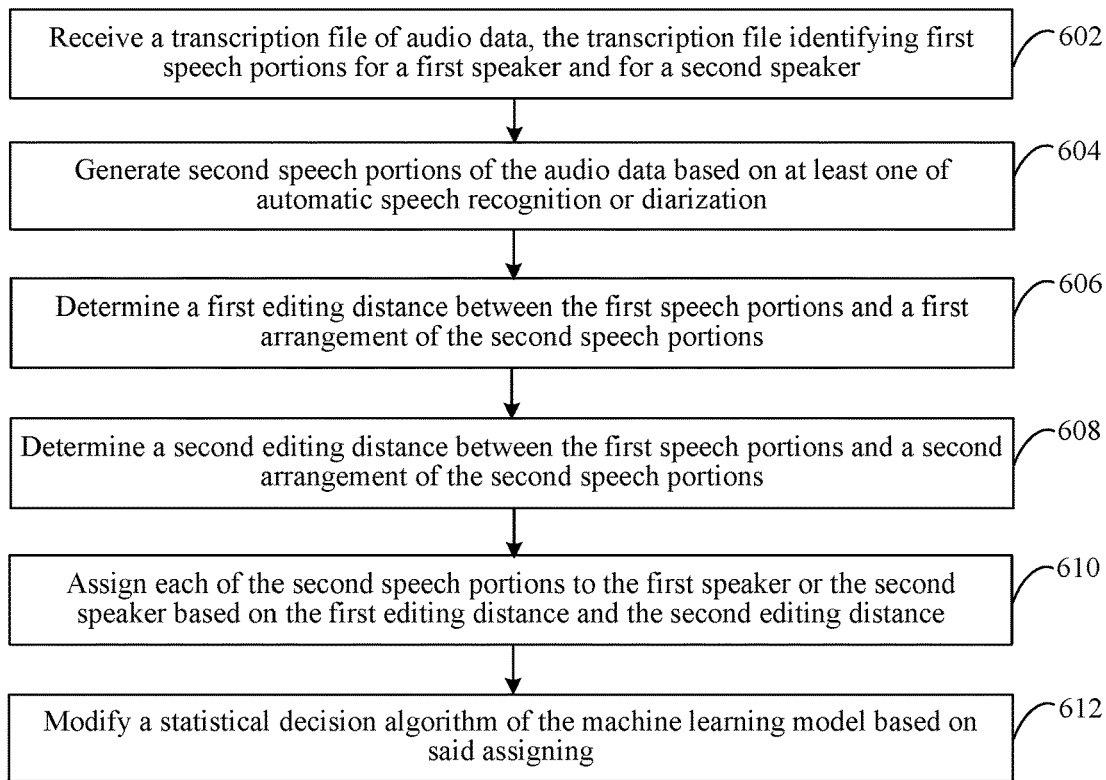
FIG. 6 shows a flowchart for maintaining and/or processing ML (machine learning) model training data, in accordance with an example embodiment.

In FIG. 6, a flowchart 600 is shown for maintaining and/or processing ML model training data, in accordance with an example embodiment. ML host 118 of system 100 may operate according to flowchart 600 in embodiments. Further structural and operational examples will be apparent to persons skilled in the relevant art(s) based on the following descriptions. Flowchart 600 is described as follows with respect to system 100 of FIG. 1 and system 200 of FIG. 2. Flowchart 600 begins with step 602.

In step 602, a transcription file of audio data is received, the transcription file identifying first speech portions for a first speaker and for a second speaker. For instance, ML host 118 may be configured to receive a transcription file of audio data that identifies speech portions for a first speaker and for a second speaker. Transcription files may be received from client device(s) 104, from host device 102, and/or from storage 106, in embodiments, where the transcription files comprise text that represents speech/conversations between one, two, three, or more, speaking parties. First speech portions for the first speaker and second speech portions for the second speaker may be provided or additionally generated in step 602 as a concatenated string of text. For example, speech portions for the first speaker may be concatenated together, e.g., temporally ordered, and then concatenated with similarly arranged speech portions for the second speaker. In embodiments, these first speech portions may be generated or verified to have complete accuracy with respect to the audio data, e.g., via human-performed transcription.

As a non-limited example, consider the following transcription file of a conversation between two parties: a support agent and a customer. [Agent]: "Good Morning, Amy speaking, How may I help you today?" [Customer]: "I haven't received my refund you promised last week." [Agent]: "One moment. Let me locate your record."

In step 604, second speech portions of the audio data are generated based on at least one of automatic speech recognition or diarization. For example, a machine learning algorithm of ML host 118, such as a statistical decision algorithm, may be configured to drive ASR and/or diarization to generate the second speech portions of the audio data, where the second speech portions may be generated as determinations of the speech as well as being identified with different speaking parties. In some cases, however, the ASR and/or the diarization results may not be completely accurate.

Continuing with the example from step 602, consider the following representation of an ASR or diarization result. [Speaker 1]: "Morning any speaking how may I help you." [Speaker 2]: "Today heaven received my refund you promised last." [Speaker 1]: "week one let me look for your record." As can be seen when compared to the accurate transcription above, some words themselves may be incorrect, some words may be missing, and some words may not be associated with the proper speaking party. Thus, comparisons to the accurate transcription may be made, utilizing the idea of editing distances, to determine whether Speaker 1 corresponds to the Support Agent or the Customer, and likewise, whether Speaker 2 corresponds to the Customer or the Support Agent.

In step 606, a first editing distance is determined between the first speech portions and a first arrangement of the second speech portions. For instance, ML host 118 and/or roles manager 208 may be configured to determine the first editing distance. In embodiments, an editing distance may be a number of edits applied to an arrangement of the second speech portions in order for it to match the first speech portions. In the example scenario set out above, where the first speech portions may be concatenated, the second speech portions may be likewise concatenated to form a single string, e.g., with all portions for one speaker preceding all portions for the other speaker. For instance, the ASR/diarization result provided in the example in step 604 may be concatenated as "Morning any speaking how may I help you week one let me look for your record Today heaven received my refund you promised last." In this example, the speech portion(s) for Speaker 1 precede the speech portion(s) for Speaker 2, and accordingly, such a first arrangement is analyzed via editing distance against the concatenation described for the example in step 602 to determine if Support Agent/Customer corresponds to Speaker 1/Speaker 2, respectively (although step 606 may instead determine the possibility Speaker 2/Speaker 1, in embodiments).

It may thus be determined in step 606 that a first number of edits, a first editing distance, must be applied to the ASR/diarization concatenation (Speaker 1-Speaker 2), e.g., to replace incorrect words, missing words, out of order words, words improperly associated with a speaking party, etc., in order for Speaker 1-Speaker 2 to match the known Support Agent-Customer concatenated transcription.

In step 608, a second editing distance is determined between the first speech portions and a second arrangement of the second speech portions. For instance, ML host 118 and/or roles manager 208 may be configured to determine the second editing distance. Continuing with the example scenario set out above, the ASR/diarization result provided in the example in step 604 may be concatenated as "Today heaven received my refund you promised last Morning any speaking how may I help you week one let me look for your record." In this example, the speech portion(s) for Speaker 2 precede the speech portion(s) for Speaker 1, and accordingly, such a second arrangement is analyzed via editing distance against the concatenation described for the example in step 602 to determine if Support Agent/Customer corresponds to Speaker 2/Speaker 2, respectively (although step 608 may instead determine the possibility Speaker 1/Speaker 2, in embodiments).

It may thus be determined in step 608 that a second number of edits must be applied to the ASR/diarization concatenation (Speaker 2-Speaker 1 in order for Speaker 2-Speaker 1 to match the known Support Agent-Customer concatenated transcription.

In step 610, each of the second speech portions is assigned to the first speaker or the second speaker based on the first editing distance and the second editing distance. For example, continuing with the example scenario above, ML host 118 may be configured to assign ones of the second speech portions to the first speaker or the second speaker based on the editing distances from step 606 and step 608. In other words, if fewer edits are needed to match Speaker 1-Speaker 2 to Support Agent-Customer than to match speaker 2-Speaker 1 to Support Agent-Customer, then ML host 118 may assign the speaking role associated with the Support Agent to Speaker 1, and thus also assign the speaking role associated with the Customer to Speaker 2. Conversely, if the second editing distance to associate Speaker 2-Speaker 1 with Support Agent-Customer is lower than the first editing distance, then ML host 118 may assign the speaking role associated with the Support Agent to Speaker 2, and thus also assign the speaking role associated with the Customer to Speaker 1.

For the above example scenario, the Speaker 1-Speaker 2 concatenation has a lower editing distance with respect to Support Agent-Customer because the Speaker 1-Speaker 2 concatenation is more similar to the Support Agent-Customer concatenation, thus Speaker 1 is assigned as Support Agent and Speaker 2 is assigned as Customer.

In step 612, a statistical decision algorithm of the machine learning model is modified based on said assigning. For instance, ML host 118 may be configured to modify (e.g., train, generate, update, etc.) its ML algorithm based on the assignments made in step 610. That is, the algorithm on which model(s) 230 are based may be trained, generated, and/or updated according to a progressing/maintenance of training data for learning through editing distances determined against known accurate transcriptions of audio data.

B. Additional Embodiments for Scrubbing Identifying Information

Systems, devices, and apparatuses may be configured in various ways to perform their functions for scrubbing identifying information from audio and/or text data, such as, but not limited to, data related to conversations between speaking parties. For example, the embodiments herein provide for systems and methods to scrub identifying information, as described herein.

Such scrubbing may be performed at different times with respect to other embodiments described herein. For instance, scrubbing may be performed prior to ML model training, generating, updating and/or after speaking role determinations, as described in the subsection above.

Referring again to system 200 in FIG. 2, computing device 202 may include scrubbing manager 216 configured scrub identifying information from data. As noted above, scrubbing manager 216 may include speech recognizer 218, context determiner 220, text identifier 222, and scrubber 224, one or more of which may be configured to scrub identifying information from audio and/or text data.

Figure 7:
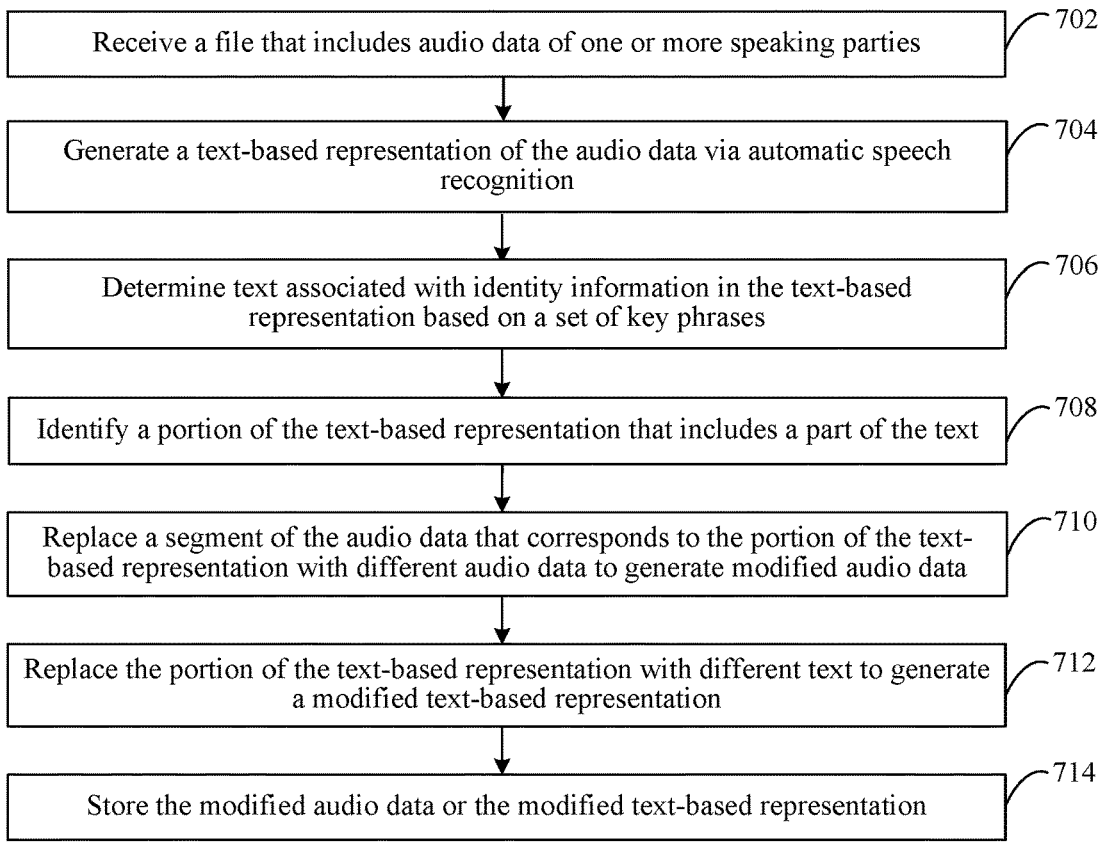
FIG. 7 shows a flowchart for scrubbing identifying information from audio and/or text data, according to an example embodiment.

In FIG. 7, a flowchart 700 is shown for scrubbing identifying information from audio and/or text data, in accordance with an example embodiment. Scrubbing manager 216 may operate according to flowchart 700 in embodiments. Further structural and operational examples will be apparent to persons skilled in the relevant art(s) based on the following descriptions. Flowchart 700 is described as follows with respect to system 100 of FIG. 1 and system 200 of FIG. 2. Flowchart 700 begins with step 702.

In step 702, a file is received that includes audio data of one or more speaking parties. For example, speech recognizer 218 of scrubbing manager 216 in system 200 (FIG. 2) may be configured to receive audio data files associated with a speaking party(ies). The audio data files may be received from client device(s) 104 of system 100 in FIG. 1, or from a memory or storage associated with system 200.

In step 704, a text-based representation of the audio data is generated via automatic speech recognition. For instance, speech recognizer 218 may be configured to generate text-based representations of the audio data. The text-based representations may be generated by speech recognition, e.g., utilizing ASR 228 of system 200, as described above, e.g., ASR engine 228 may comprise a portion of speech recognizer 218, or may be a separate component that is accessed by speech recognizer 218.

In step 706, text associated with identifying information in the text-based representation is determined based on a set of key phrases. For example, context determiner 220 may be configured to determine a context associated with portions of a text-based representation based on key phrase comparisons. That is, as described herein, the text-based representation may include contextual information, e.g., the word "email," the phrase "dot com," a length of numbers/alphanumeric character such as a 16-digit number for a credit card, a 7- or 10-digit telephone number, etc., while other words that may be misconstrued or confused by ASR, e.g., "at" may or may not represent '@', and may be ignored as contextual key phrases but may be used as context when combined with "email," "dot com," and/or the like. Context determiner 220 is configured to determine the context of the portions based on such information, words, phrases, etc.

In step 708, a portion of the text-based representation that includes a part of the text is identified. For instance, text identifier 222 may be configured to identify parts of the text, based on the context, that include identifying information of a customer or user. As an example, within the portions of the text-based representation (that have a context indicative of identifying information), only a specific part of those portions may be identified for scrubbing in order to leave as much of the original text (that is not identifying information) unchanged.

As described herein, a portion of the text-based representation that includes a part of the text associated that is with the identifying information may be identified by text identifier for scrubbing. In embodiments, the portion may be larger than just the identifying information to be removed, and may include other information that is valuable for understanding the entire conversation. Accordingly, only the part of the portion may be identified for scrubbing. Determining a range or boundary of the identified part to be scrubbed/replaced may be performed, as described below, according to FIG. 8.

In step 710, a segment of the audio data that corresponds to the portion of the text-based representation is replaced with different audio data. For example, scrubber 224 may be configured to replace, i.e., scrub, data that relates to identifying information in audio files. In embodiments, scrubber 224 may replace a segment of the audio data corresponding to the portion in step 708 with audio data that is not identifying. The replacement audio data may be silence, a tone, etc., as described herein. Further details regarding step 710 are provided below with respect to FIG. 9.

In step 712, the portion of the text-based representation is replaced with different text. For example, scrubber 224 may be configured to scrub data that relates to identifying information in text files. In embodiments, scrubber 224 may replace the portion of the text-based representation from step 708 with text data that is not identifying. The replacement text data may be blank spaces, asterisks, etc., as described herein. Further details regarding step 712 are provided below with respect to FIG. 9.

As noted above, data/information scrubbing may be performed according to a range or boundary, or more specifically in embodiments, to an initial boundary and a final boundary that encompass the scope of information to be scrubbed as a range of data to be replaced.

In step 714, modified audio data or a modified text-based representation is stored based on removal of the identifying information. For example, modified audio data and/or modified text-based representations may be stored in a storage, such as but without limitation, memory 206 and/or storage 106 by roles manager 208 or a component thereof, in embodiments. Such stored data/representations may be stored with annotations that identify it as scrubbed.

Figure 8:
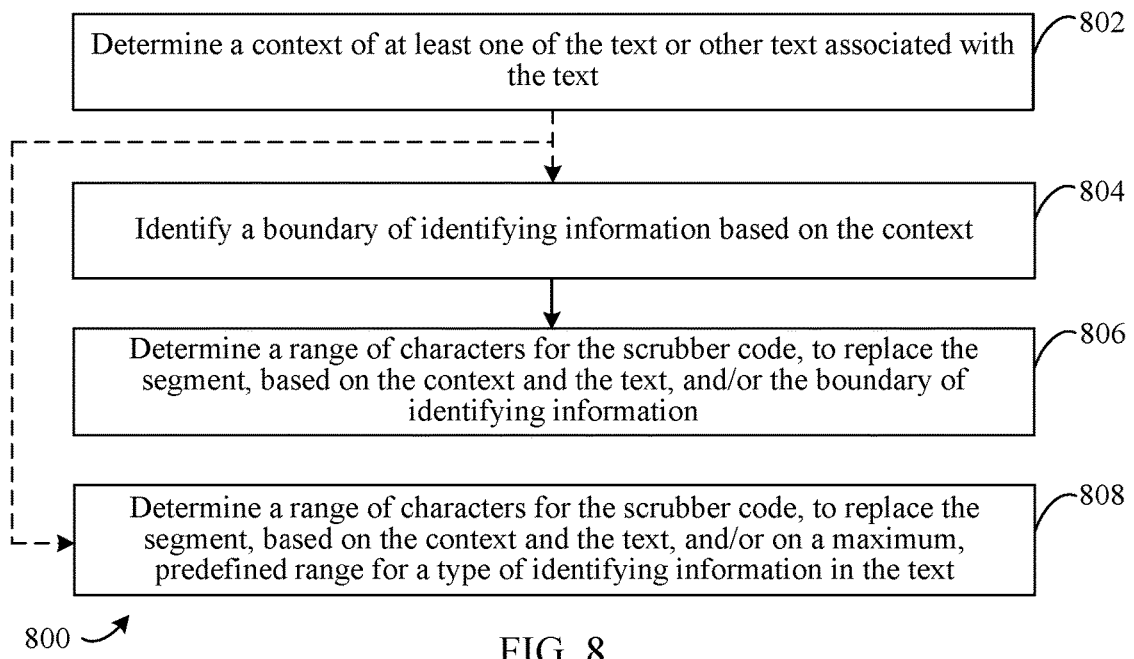
FIG. 8 shows a flowchart for scrubbing identifying information from audio and/or text data using a range or boundary, in accordance with an example embodiment.

In FIG. 8, a flowchart 800 is shown for scrubbing identifying information from audio and/or text data using a range or boundary, in accordance with an example embodiment. Scrubbing manager 216 may operate according to flowchart 800 in embodiments. Flowchart 800 may be an embodiment of flowchart 700. Further structural and operational examples will be apparent to persons skilled in the relevant art(s) based on the following descriptions. Flowchart 800 is described as follows with respect to system 200 of FIG. 2. Flowchart 800 begins with step 802.

In step 802, a context of at least one of the text or other text associated with the text is determined. For example, context determiner 220 of scrubbing manager 216 in system 200 (FIG. 2) may be configured to determine one or more contexts of any section of the text determined in step 706 of flowchart 700. For example, context determiner 220 may be configured to determine a context associated with portions of a text-based representation based on key phrase comparisons, as well as other text surrounding the key phrases. That is, as described herein, the text-based representation may include additional contextual information, as well as key phrases, such as, but without limitation, "send it to my email," "no, it's," "can you please repeat your PIN?," "my security phrase is," "preferred contact number," "yes, it's," "can you please verify your address?" and/or the like.

Step 802 may be performed prior to step 708 of flowchart 700 in FIG. 7. From step 802, flowchart 800 may continue to step 804, or to step 808, in various embodiments.

In step 804, a boundary of identifying information is identified based on the context. For instance, context determiner 220 may be configured to identify boundaries for scrubbing identifying information. A boundary may be identified/determined based on context as described herein, e.g., in step 802. A context utilized by context determiner 220 may be a characteristic of the text that is at least one of: a character length of the text, a character type of the text, or a phrase included in the other text, and/or the like, as described herein. As an example, context determiner 220 may determine in step 706 that an email address, one type of text that is identifying information, is present. Contextual information may be then used by context determiner 220 to identify boundaries, e.g., the phrase "dot com" may represent the final boundary, and a phrase "send it to my email," or the like as described herein, may represent the initial boundary.

In step 806, a range of characters for the scrubber code is determined to replace the segment based on the context and the text and/or the boundary of identifying information. For example, context determiner 220 may be configured to determine a range of characters for the scrubber, to replace the segment, based on the context, the boundary information, and/or the text. In an example scenario, a text representation of a customer providing their email address (e.g., FirstName23.LastName@emailhostprovider.com) may be "my email is first name twenty three dot last name at email host provider dot com." Having recognized that an email address is provided via the context and key phrases, and having identified, e.g., "my email is" as the initial boundary and "dot com" as the final boundary, context determiner 220 may begin at some character within the email address and expand a range of characters until both boundaries are reached. In this example, but not by way of limitation, the in "dot com" may be the starting point to expand the range: ".com" represents 4 characters to the final boundary, and "FirstName23.LastName@emailhostprovider" represents 38 characters to the initial boundary, for a total of 42 characters in the determined range to be applied by scrubber 224.

In embodiments, step 710 of flowchart 700 in FIG. 7 may be performed based on step 804 and/or step 806 of flowchart 800. Flowchart 800 may end after step 806 and not proceed to step 808.

From step 802, flowchart 800 may proceed to step 808. In step 808, a range of characters for the scrubber code is determined to replace the segment based on the context and the text and/or on a maximum, predefined range for a type of identifying information in the text. For instance, context determiner 220 may be configured to determine a range of characters for scrubber 224 based on the context and the text and/or on a maximum, predefined range for the type of identifying information. In an example, an email address may be scrubbed up to 40 characters (or some other desired number of characters) back from the end of ".com" (where in the example email address above "Fi" of "FirstName23" would remain un-scrubbed for a 40 character range) or forward from the beginning of the email address (where "om" of ".com" would remain). In embodiments, scrubbing may be desired to an initial or final boundary, while in other embodiments, a predetermined range of characters may be identified for scrubbing.

In embodiments, step 710 of flowchart 700 in FIG. 7 may be performed based on step 808 of flowchart 800.

Figure 9:
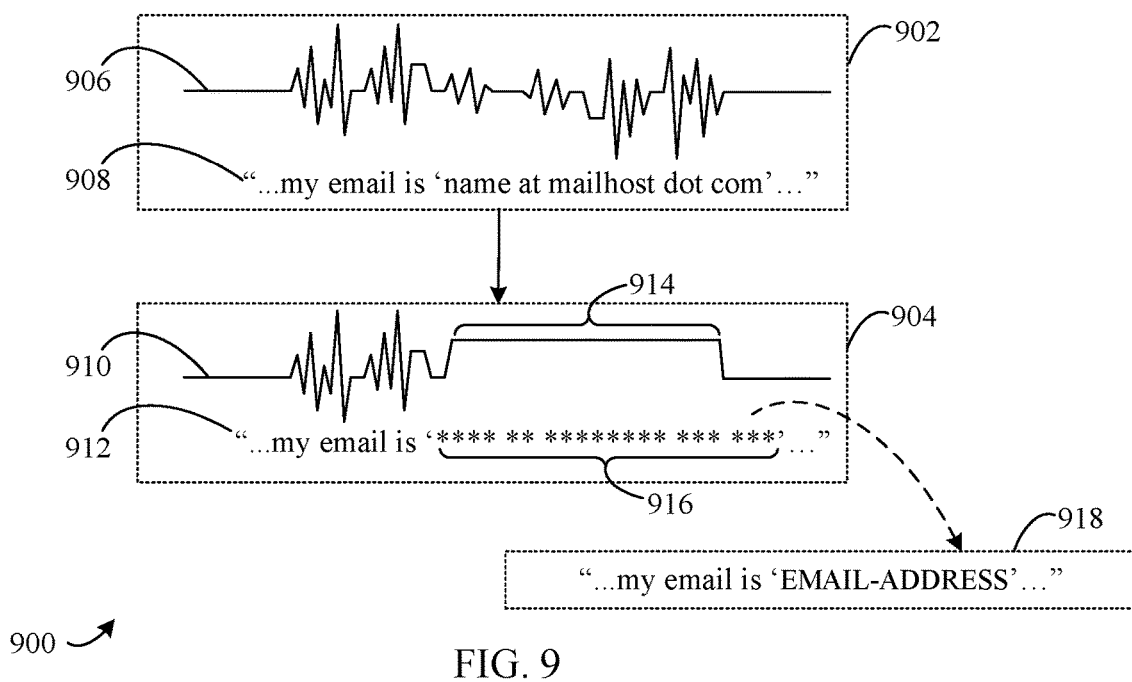
FIG. 9 shows a flow diagram of the scrubbing of identifying information in audio/text files as in FIGS. 7-8, in accordance with example embodiments.

FIG. 9 shows a flow diagram 900 for scrubbing of identifying information in audio/text files, in accordance with an example embodiment. Scrubbing manager 216 may operate according to flow diagram 900 in embodiments. Flow diagram 900 may be an embodiment of flowchart 700 and/or flowchart 800 described above. Further structural and operational examples will be apparent to persons skilled in the relevant art(s) based on the following descriptions. Flow diagram 900 is described as follows with respect to system 200 of FIG. 2. Flow diagram 900 begins with step 902.

In step 902, a text-based representation 908 is generated using ASR from a received audio file 906, as similarly described in step 702 and step 704 of flowchart 700. As shown, and as described for step 706 of flowchart 700, identifying information, e.g., a customer email address, is determined in a portion of text of text-based representation 908 based on key phrases: "name at mailhost dot com." In this described example, contextual information is used to identify the portion of text shown for text-based representation 908 " . . . my email is 'name at mailhost dot com'," as in step 708 of flowchart 700. Additional steps described in flowchart 800 may also be performed.

In step 904, scrubbing of text-based representation 908 and/or received audio file 906 are performed as described in flowchart 700 and flowchart 800. For instance, scrubbing of text-based representation 908 and/or received audio file 906 may be performed based on boundaries and/or ranges. As illustrated in this non-limiting example, a scrubbed audio file 910 and a scrubbed text-representation 912 are generated by scrubber 224. That is, a segment 914 of audio file 906 is replaced with a constant tone (e.g., audio data that is not identifying of a customer) in scrubbed audio file 910 (as described in step 710 of flowchart 700), and the text determined to be identifying information, i.e., an email address, in text-based representation 908 is replaced in scrubbed text-representation 912 (as described in step 712 of flowchart 700) as placeholder characters 916 shown as asterisks '*' (e.g., text data that is not identifying of a customer).

In embodiments, a descriptor corresponding to the type of identifying information may be used as replacement text for scrubbed identifying information. For example, a descriptor 918 shown as "EMAIL-ADDRESS" which provides an indication of the type of identifying information that was scrubbed.

The scrubbed versions, scrubbed audio file 910 and/ scrubbed text-representation 912, may be then be saved in place of the original versions, received audio file 906 and/or text-based representation 908, respectively, to provide for protection of user data and privacy.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including without limitation system 100 of FIG. 1 and system 200 of FIG. 2, along with any components and/or subcomponents thereof, as well as any flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 10:
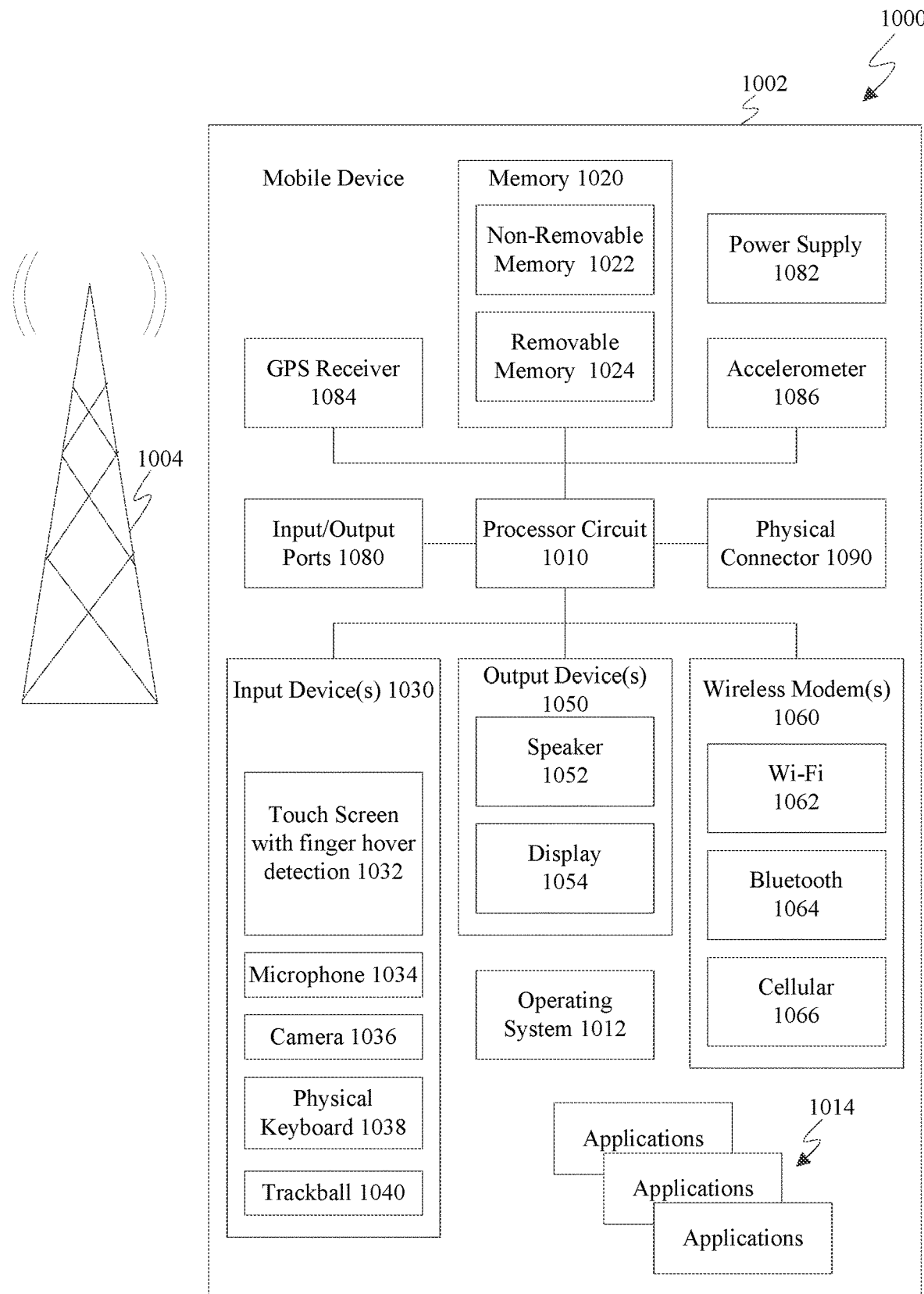
FIG. 10 shows a block diagram of an example mobile device that may be used to implement various example embodiments.

FIG. 10 is a block diagram of an exemplary mobile system 1000 that includes a mobile device 1002 that may implement embodiments described herein. For example, mobile device 1002 may be used to implement any system, client, or device, or components/subcomponents thereof, in the preceding sections. As shown in FIG. 10, mobile device 1002 includes a variety of optional hardware and software components. Any component in mobile device 1002 can communicate with any other component, although not all connections are shown for ease of illustration. Mobile device 1002 can be any of a variety of computing devices (e.g., cell phone, smart phone, handheld computer, Personal Digital Assistant (PDA), etc.) and can allow wireless two-way communications with one or more mobile communications networks 1004, such as a cellular or satellite network, or with a local area or wide area network.

Mobile device 1002 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components of mobile device 1002 and provide support for one or more application programs 1014 (also referred to as "applications" or "apps"). Application programs 1014 may include common mobile computing applications (e.g., e-mail applications, calendars, contact managers, web browsers, messaging applications) and any other computing applications (e.g., word processing applications, mapping applications, media player applications).

Mobile device 1002 can include memory 1020. Memory 1020 can include non-removable memory 1022 and/or removable memory 1024. Non-removable memory 1022 can include RAM, ROM, flash memory, a hard disk, or other well-known memory devices or technologies. Removable memory 1024 can include flash memory or a Subscriber Identity Module (SIM) card, which is well known in GSM communication systems, or other well-known memory devices or technologies, such as "smart cards." Memory 1020 can be used for storing data and/or code for running operating system 1012 and application programs 1014. Example data can include web pages, text, images, sound files, video data, or other data to be sent to and/or received from one or more network servers or other devices via one or more wired or wireless networks. Memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1020. These programs include operating system 1012, one or more application programs 1014, and other program modules and program data. Examples of such application programs or program modules may include, for example, computer program logic (e.g., computer program code or instructions) for implementing one or more of system 100 of FIG. 1 and system 200 of FIG. 2, along with any components and/or subcomponents thereof, as well as the flowcharts/flow diagrams described herein, including portions thereof, and/or further examples described herein.

Mobile device 1002 can support one or more input devices 1030, such as a touch screen 1032, a microphone 1034, a camera 1036, a physical keyboard 1038 and/or a trackball 1040 and one or more output devices 1050, such as a speaker 1052 and a display 1054. Other possible output devices (not shown) can include piezoelectric or other haptic output devices. Some devices can serve more than one input/output function. For example, touch screen 1032 and display 1054 can be combined in a single input/output device. Input devices 1030 can include a Natural User Interface (NUI).

One or more wireless modems 1060 can be coupled to antenna(s) (not shown) and can support two-way communications between processor 1010 and external devices, as is well understood in the art. Modem 1060 is shown generically and can include a cellular modem 1066 for communicating with the mobile communication network 1004 and/or other radio-based modems (e.g., Bluetooth 1064 and/or Wi-Fi 1062). At least one wireless modem 1060 is typically configured for communication with one or more cellular networks, such as a GSM network for data and voice communications within a single cellular network, between cellular networks, or between the mobile device and a public switched telephone network (PSTN).

Mobile device 1002 can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components of mobile device 1002 are not required or all-inclusive, as any components can be deleted and other components can be added as would be recognized by one skilled in the art.

In an embodiment, mobile device 1002 is configured to implement any of the above-described features of flowcharts herein. Computer program logic for performing any of the operations, steps, and/or functions described herein may be stored in memory 1020 and executed by processor 1010.

Figure 11:
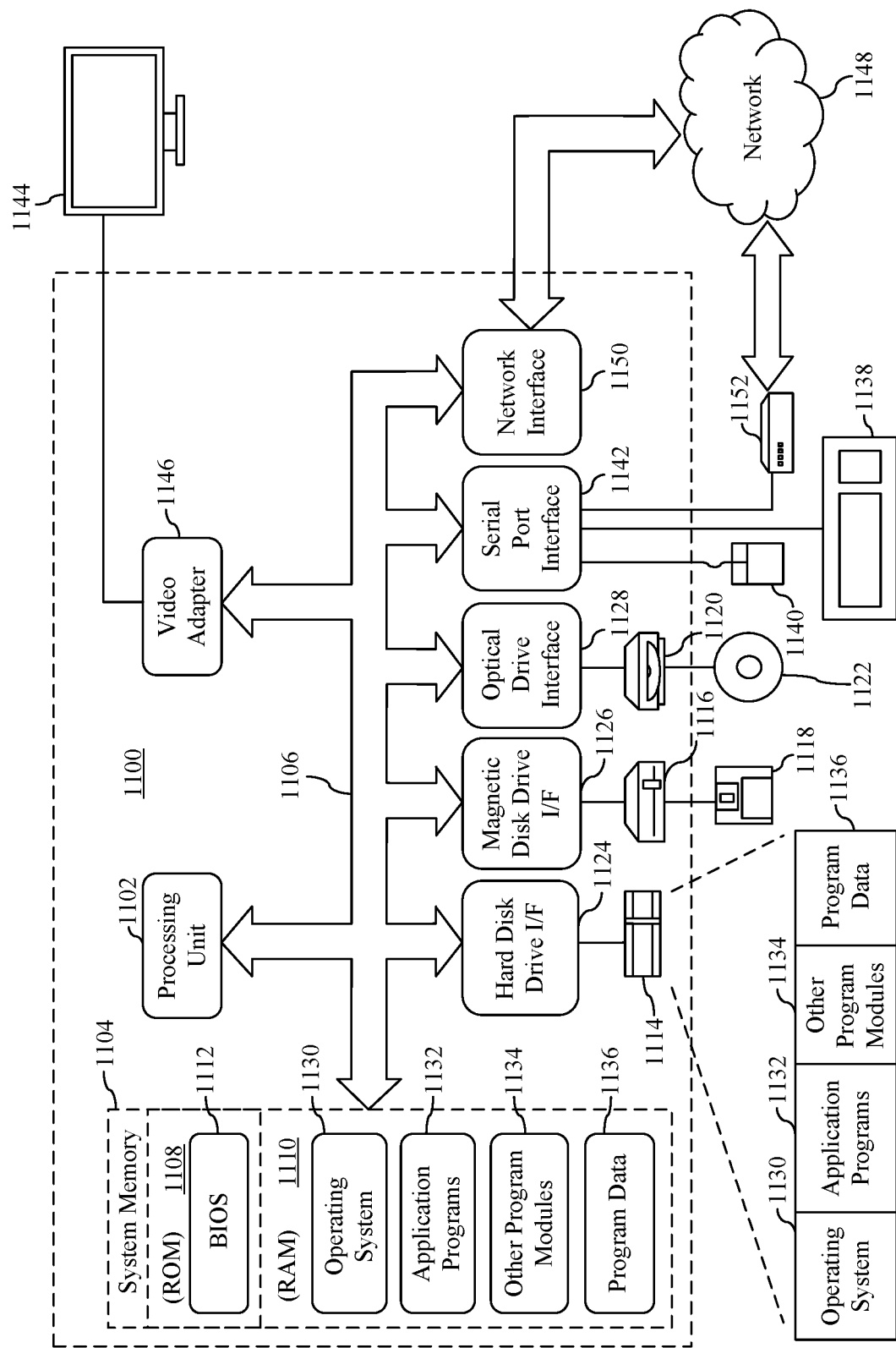
FIG. 11 shows a block diagram of an example computing device that may be used to implement embodiments.

FIG. 11 depicts an exemplary implementation of a computing device 1100 in which embodiments may be implemented. For example, embodiments described herein may be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems and/or game consoles, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as but not limited to, system 100 of FIG. 1 and system 200 of FIG. 2, along with any components and/or subcomponents thereof, as well as the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

It is contemplated herein that different languages, other than English as used in the descriptions of embodiments, may be present in embodiments without altering the underlying concepts of the described embodiments. The described embodiments herein also provide for more robust data and privacy protection, while still maintaining as much possible context/information for the determination of conversational support metrics. Moreover, the described embodiments do not exist in software implementations for speaker role determination and scrubbing identifying information. Conventional solutions lack the ability to implement contextual information in conversation data with diarization, speaker role determination, data scrubbing, and ML models/algorithms, and are thus prone to errors.

The additional examples and embodiments described in this Section may be applicable to examples disclosed in any other Section or subsection of this disclosure.

Some embodiments above provide for systems, devices, and methods for determining speaking roles and processing/maintaining training data for ML models. For instance, a system is described herein. The system may be configured and enabled in various ways for determining speaking roles, as described herein. The system includes at least one processor and a memory that stores computer program instructions that are executable by the processor(s). The computer program instructions include an apportioner, a characteristic identifier, and a data aggregator. The apportioner is configured to receive a file that includes data related to a first speaking party and a second speaking party, and divide the data into portions based on one or more characteristics of the data. The characteristic identifier is configured to identify classifying characteristics of speaking party roles in each of the portions. The data aggregator is configured to generate, from the portions, respective data sets corresponding to the first speaking party and the second speaking party based at least on the identified classifying characteristics. The characteristic identifier is also configured to assign a speaking party role for at least one of the data sets.

In an embodiment of the system, the one or more characteristics of the data comprise a pattern of speech in the data.

In an embodiment of the system, the data comprises audio data, and to identify the classifying characteristics of the speaking party roles, the characteristic identifier is configured to analyze one of the portions against at least one stored audio sample.

In an embodiment, the system further includes a speech recognizer configured to generate text data as a text representation of the audio data. In the embodiment, the characteristic identifier is configured to identify one or more of the classifying characteristics based on textual patterns from the text representation.

In an embodiment of the system, the characteristic identifier is configured to identify the classifying characteristics based on the at least one stored audio sample and the textual patterns at least partially concurrently.

In an embodiment of the system, the data comprises text data derived via automatic speech recognition of audio data, and the one or more classifying characteristics comprise a textual pattern in the text data.

In an embodiment of the system, to identify the classifying characteristics, the characteristic identifier is configured to analyze the textual pattern against at least one text pattern set associated with one or more speaking party roles.

In an embodiment of the system, the characteristic identifier is configured to implement a speaking roles model that is based at least on the one or more classifying characteristics and that is trained by a machine learning algorithm that utilizes editing distances between transcribed representations of audio data and representations based on of one or more of automatic speech recognition of the audio data or diarization of the audio data.

A computer-implemented method is also described herein. The computer-implemented method may be for determining speaking roles, as described herein. The computer-implemented method includes dividing data related to one or more of a first speaking party or a second speaking party into portions based on one or more characteristics of the data, and identifying classifying characteristics of speaking party roles in each of the portions. The computer-implemented method also includes generating, from the portions, respective data sets corresponding to the one or more of the first speaking party or the second speaking party based at least on the classifying characteristics identified, and one of the data sets in a memory with an annotation identifying a speaking party role associated with the one of the data sets. In an embodiment, the computer-implemented method includes assigning a speaking party role for one of the data sets.

In an embodiment of the computer-implemented method, the one or more characteristics of the data comprise a pattern of speech in the data.

In an embodiment of the computer-implemented method, the data comprises audio data, and identifying the classifying characteristics of the speaking party roles includes analyzing one of the portions against at least one stored audio sample.

In an embodiment, the computer-implemented method includes generating text data as a text representation of the audio data, and identifying one or more of the classifying characteristics is based on textual patterns from the text representation.

In an embodiment, the computer-implemented method includes identifying the classifying characteristics based on the at least one stored audio sample and the textual patterns at least partially concurrently.

In an embodiment of the computer-implemented method, the data comprises text data derived via automatic speech recognition of audio data, and the one or more classifying characteristics comprise a textual pattern in the text data.

In an embodiment of the computer-implemented method, identifying classifying characteristics includes analyzing the textual pattern against at least one text pattern set associated with one or more speaking party roles.

In an embodiment of the computer-implemented method, identifying classifying characteristics is performed utilizing a speaking roles model that is based at least on the one or more classifying characteristics and that is trained by a machine learning algorithm that utilizes editing distances between transcribed representations of audio data and representations based on of one or more of automatic speech recognition of the audio data or diarization of the audio data.

In an embodiment of the computer-implemented method, the speaking roles model comprises a statistical probability algorithm that indicates a likelihood of a given one of the portions being associated with one of the one or more of the first speaking party or the second speaking party, and generating is based on the statistical probability algorithm.

A computer-readable storage medium having program instructions recorded thereon that, when executed by a processing device, perform a method for maintaining and/or processing ML (machine learning) model training data, is also described. The method includes receiving a transcription file of audio data, the transcription file identifying first speech portions for a first speaker and for a second speaker, and generating second speech portions of the audio data based on at least one of automatic speech recognition or diarization. The method also includes determining a first editing distance between the first speech portions and a first arrangement of the second speech portions, and determining a second editing distance between the first speech portions and a second arrangement of the second speech portions. The method further includes assigning each of the second speech portions to the first speaker or the second speaker based on the first editing distance and the second editing distance, and modifying a statistical decision algorithm of the machine learning model based on said assigning.

In an embodiment of the computer-readable storage medium, the first editing distance includes a first number of edits applied to the first arrangement of the second speech portions in order to match the first speech portions and the second editing distance includes a second number of edits applied to the second arrangement of the second speech portions in order to match the first speech portions.

In an embodiment of the computer-readable storage medium, in the method, generating is based on the automatic speech recognition and the diarization.

Some embodiments above provide for systems, devices, and methods for scrubbing identifying information from data, such as audio and/or text data. For instance, a system is described herein. The system may be configured and enabled in various ways for scrubbing identifying information, as described herein. The system includes at least one processor and a memory that stores computer program instructions that are executable by the processor(s). The computer program instructions include a speech recognizer, a context determiner, a text identifier, and a scrubber. The speech recognizer is configured to receive a file that includes audio data of one or more speaking parties, and generate a text-based representation of the audio data via automatic speech recognition. The context determiner is configured to determine text associated with identifying information in the text-based representation based on a set of key phrases and/or key words. The text identifier is configured to identify a portion of the text-based representation that includes a part of the text, and the scrubber configured to replace a segment of the audio data that corresponds to the portion of the text-based representation with different audio data.

In an embodiment of the system, the scrubber is configured to replace the portion of the text-based representation with different text.

In an embodiment of the system, the context determiner is configured to determine a context of at least one of the text or other text associated with the text, and determine a range of characters for the scrubber, to replace the segment, based on the context and the text. In the embodiment, a context for the text comprises a characteristic of the text from at least one of a character length of the text, a character type of the text, or a phrase included in the other text. In an embodiment, the context determiner is configured to identify a boundary of identifying information based on the context, and determine the range of characters based on the boundary of identifying information. In an embodiment, the context determiner is configured to determine the range of characters based on a maximum, predefined range for a type of identifying information in the text.

In an embodiment of the system, the scrubber is configured to replace the segment based on timing information of the generated text-based representation.

A computer-readable storage medium having program instructions recorded thereon that, when executed by a processing device, perform a method for scrubbing identifying information from audio and textual data, is also described. The method includes generating a text-based representation of audio data from a file via automatic speech recognition, the audio data including data of one or more speaking parties, and determining text associated with identifying information in the text-based representation based on a set of key phrases and/or key words. The method also includes identifying a portion of the text-based representation that includes a part of the text, storing modified audio data or a modified text-based representation based on removal of the identifying information. In an embodiment, the method includes replacing a segment of the audio data that corresponds to the portion of the text-based representation with different audio data that prevents determination of the identifying information, and replacing the portion of the text-based representation with different text that prevents determination of the identifying information.

In an embodiment, the computer-implemented method includes replacing the portion of the text-based representation with different text that prevents determination of the identifying information.

In an embodiment, the computer-implemented method includes determining a context of at least one of the text or other text associated with the text, and determining a range of characters to replace the segment based on the context and the text.

In an embodiment of the computer-implemented method, a context for the text comprises a characteristic of the text from at least one of a character length of the text, a character type of the text, or a phrase included in the other text.

In an embodiment, the computer-implemented method includes identifying a boundary of identifying information based on the context, and determining the range of characters based on the boundary of identifying information.

In an embodiment, the computer-implemented method includes determining the range of characters based on a maximum, predefined range for a type of identifying information in the text.

In an embodiment, the computer-implemented method includes replacing the segment based on timing information of the generated text-based representation.

A computer-readable storage medium having program instructions recorded thereon that, when executed by a processing device, perform a method for scrubbing identifying information from audio and textual data, is also described. The method includes generating a text-based representation of audio data from a file via automatic speech recognition, the audio data including data of one or more speaking parties, and determining text associated with identifying information in the text-based representation based on a set of key phrases and/or key words. The method also includes identifying a portion of the text-based representation that includes a part of the text, replacing a segment of the audio data that corresponds to the portion of the text-based representation with different audio data that prevents determination of the identifying information, and replacing the portion of the text-based representation with different text that prevents determination of the identifying information.

In an embodiment of the computer-readable storage medium, the method includes determining a context of at least one of the text or other text associated with the text, and determining a range of characters to replace the segment based on the context and the text.

In an embodiment of the computer-readable storage medium, a context for the text comprises a characteristic of the text from at least one of a character length of the text, a character type of the text, or a phrase included in the other text.

In an embodiment of the computer-readable storage medium, the method includes identifying a boundary of identifying information based on the context, and determining the range of characters based on the boundary of identifying information.

In an embodiment of the computer-readable storage medium, the method includes determining the range of characters based on a maximum, predefined range for a type of identifying information in the text.

In an embodiment of the computer-readable storage medium, the method includes replacing the segment based on timing information of the generated text-based representation.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system comprising:
   at least one processor; and
   a memory that stores computer program instructions that are executable by the at least one processor, the computer program instructions comprising:
      an apportioner configured to:
         receive a file that includes data related to a first speaking party and a second speaking party, and
         divide the data into portions based on one or more characteristics of the data;
      a characteristic identifier configured to identify classifying characteristics of speaking party roles in each of the portions; and
      a data aggregator configured to generate, respectively from the portions, data sets corresponding to the first speaking party and the second speaking party based at least on the identified classifying characteristics;
      the characteristic identifier being configured to assign a speaking party role for at least one of the data sets, the characteristic identifier being based at least on one or more of the classifying characteristics and including a speaking roles model trained by a machine learning algorithm that utilizes editing distances between verified transcribed representations of the data and representations based on one or more of automatic speech recognition of audio data comprising the data or diarization of the audio data.

2. The system of claim 1, wherein the one or more characteristics of the data comprise a pattern of speech in the data.

3. The system of claim 2, wherein to identify the classifying characteristics of the speaking party roles, the characteristic identifier is configured to analyze one of the portions against at least one stored audio sample.

4. The system of claim 3, further comprising:
a speech recognizer configured to generate text data as a text representation of the audio data; and
wherein the characteristic identifier is configured to identify one or more of the classifying characteristics based on textual patterns from the text representation.

5. The system of claim 4, wherein the characteristic identifier is configured to identify the classifying characteristics based on the at least one stored audio sample and the textual patterns at least partially concurrently.

6. The system of claim 1, wherein the data comprises text data derived via automatic speech recognition of audio data, and
wherein the one or more classifying characteristics comprise a pattern of text in the text data.

7. The system of claim 6, wherein to identify the classifying characteristics, the characteristic identifier is configured to analyze the pattern of text against at least one text pattern set associated with one or more speaking party roles.

8. The system of claim 1, wherein the speaking roles model is configured to determine a lesser of two editing distances as corresponding to an assignment of two speaker roles for two alternative speaking party designations.

9. A computer-implemented method, comprising:
dividing data related to one or more of a first speaking party or a second speaking party into portions based on one or more characteristics of the data;
identifying classifying characteristics of speaking party roles in each of the portions;
generating, respectively from the portions, data sets corresponding to the one or more of the first speaking party or the second speaking party based at least on the classifying characteristics identified;
assigning a speaking party role for one of the data sets by a characteristic identifier, the characteristic identifier being based at least on one or more of the classifying characteristics and including a speaking roles model trained by a machine learning algorithm that utilizes editing distances between verified transcribed representations of the data and representations based on one or more of automatic speech recognition of audio data comprising the data or diarization of the audio data; and
storing one of the data sets in a memory with an annotation identifying the speaking party role associated with the one of the data sets.

10. The computer-implemented method of claim 9, wherein the one or more characteristics of the data comprise a pattern of speech in the data.

11. The computer-implemented method of claim 10, wherein the data comprises audio data, and
wherein said identifying the classifying characteristics of the speaking party roles includes analyzing one of the portions against at least one stored audio sample.

12. The computer-implemented method of claim 11, further comprising:
generating text data as a text representation of the audio data.

13. The computer-implemented method of claim 12, further comprising:
identifying the classifying characteristics based on the at least one stored audio sample and the textual pattern at least partially concurrently.

14. The computer-implemented method of claim 9,
wherein the data comprises text data derived via automatic speech recognition of audio data, and
wherein the one or more classifying characteristics comprise a pattern of text in the text data.

15. The computer-implemented method of claim 14, wherein said identifying classifying characteristics includes:
analyzing the pattern of text against at least one text pattern set associated with one or more speaking party roles.

16. The computer-implemented method of claim 9, wherein the speaking roles model is configured to determine a lesser of two editing distances as corresponding to an assignment of two speaker roles for two alternative speaking party designations.

17. The computer-implemented method of claim 16, wherein the speaking roles model comprises a statistical probability algorithm that indicates a likelihood of a given one of the portions being associated with one of the one or more of the first speaking party or the second speaking party, and
wherein said generating is based on the statistical probability algorithm.

18. A computer-readable storage medium having program instructions recorded thereon that, when executed by a processing device, perform a method comprising:
dividing data related to one or more of a first speaking party or a second speaking party into portions based on one or more characteristics of the data;
identifying classifying characteristics of speaking party roles in each of the portions;
generating, respectively from the portions, data sets corresponding to the one or more of the first speaking party or the second speaking party based at least on the classifying characteristics identified;
assigning a speaking party role for one of the data sets by a characteristic identifier, the characteristic identifier being based at least on one or more of the classifying characteristics and including a speaking roles model trained by a machine learning algorithm that utilizes editing distances between verified transcribed representations of the data and representations based on one or more of automatic speech recognition of audio data comprising the data or diarization of the audio data; and
storing one of the data sets in a memory with an annotation identifying the speaking party role associated with the one of the data sets.

19. The computer-readable storage medium of claim 18, wherein the one or more characteristics of the data comprise a pattern of speech in the data.

20. The computer-readable storage medium of claim 18, wherein the data comprises audio data, and said identifying the classifying characteristics of the speaking party roles includes analyzing one of the portions against at least one stored audio sample;
wherein the method further comprises:
generating text data as a text representation of the audio data.

* * * * *